Nov. 8, 1927.  
G. H. CRAVENS  
1,648,676  
TRAILER TRUCK  
Filed Jan. 21, 1926
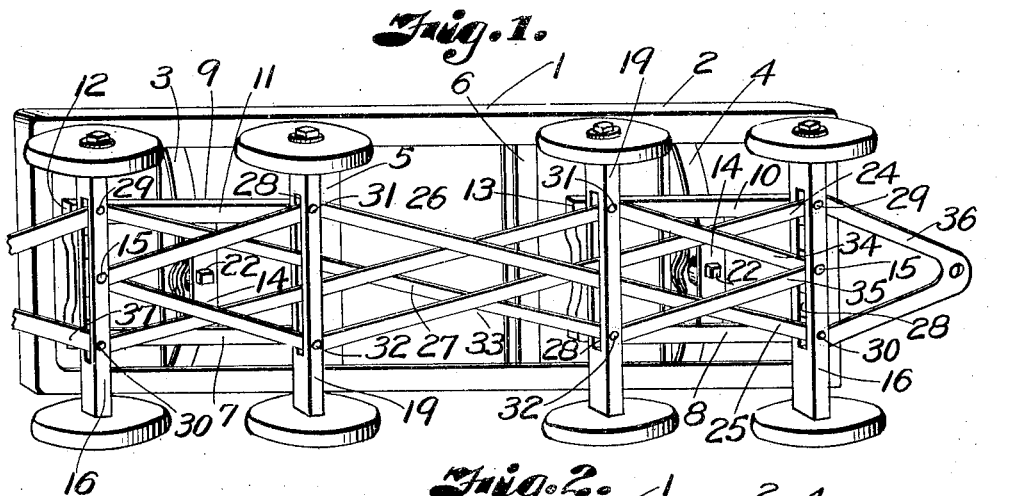
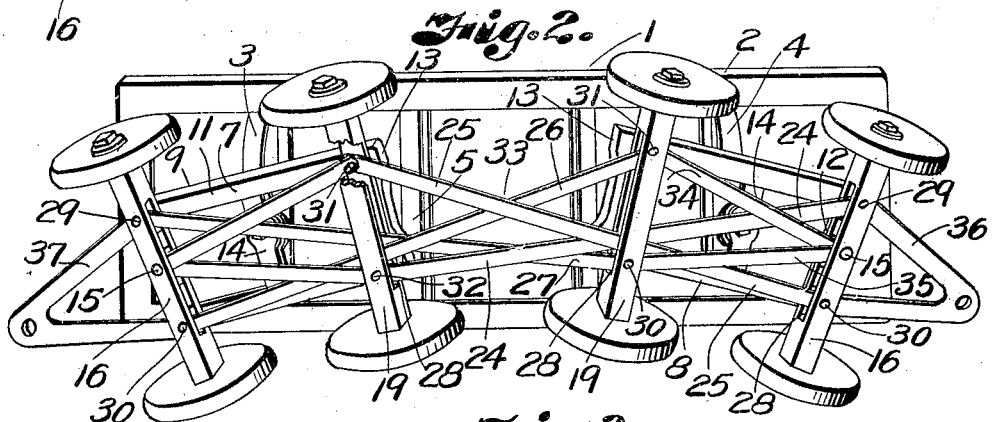
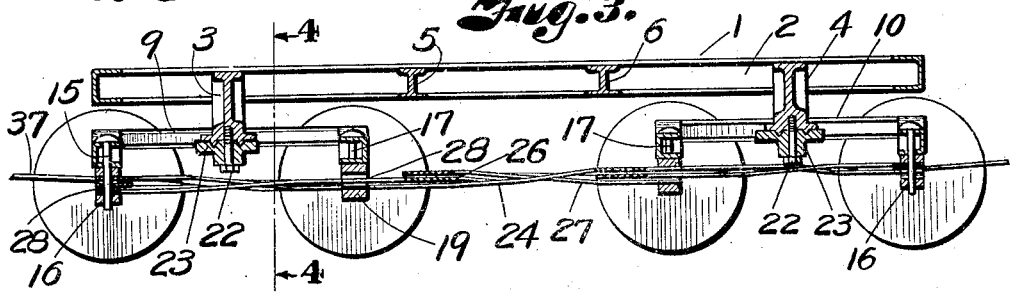
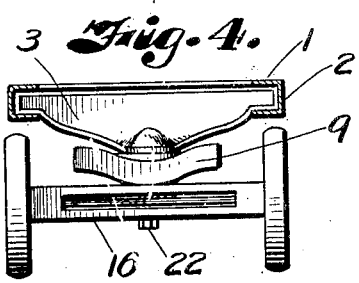
INVENTOR  
Graham H. Cravens  
BY  
ATTORNEY Patented Nov. 8, 1927.

1,648,676

UNITED STATES PATENT OFFICE.

GRAHAM H. CRAVENS, OF KANSAS CITY, MISSOURI, ASSIGNOR OF ONE-HALF TO FRANK P. SARGENT, OF LEAVENWORTH, KANSAS.

TRAILER TRUCK.

Application filed January 21, 1926. Serial No. 82,739.

This invention relates to vehicles and more particularly to those of the double or multiple truck type, the principal object of the invention being to provide for the steering of the rear trucks so that they will follow in the track of the front truck to provide for shorter turning.

In accomplishing this and other objects of my invention I have provided improved details of structure, and for the purpose of illustration of my invention, I have shown and described it as embodied in a double truck trailer illustrated in the accompanying drawings wherein:—

Fig. 1 is a detail perspective view of the under side of a trailer truck embodying my invention, particularly illustrating the steering mechanism between trucks and showing the wheels in alignment as when the truck is traveling in a straight course.

Fig. 2 is a similar view, showing the trucks and axles angling as when the trailer is traveling about a curve.

Fig. 3 is a vertical, sectional view through the longitudinal center line of the truck.

Fig. 4 is a vertical, cross sectional view on the line 4—4, Fig. 3.

Referring more in detail to the drawings by numerals of reference, 1 designates a truck platform consisting of a rectangular frame of channel irons or like rails 2 carrying front and rear bolsters 3 and 4 and intermediate cross rails 5 and 6, preferably welded to the frame.

The running gear for the trailer comprises truck members 7 and 8, each consisting of a rectangular frame member 9 or 10 formed of longitudinal channel rails 11, end rails 12 and 13, and a cross rail 14 connecting the side rails intermediate their ends.

Pivotally mounted to the outer end rails 12 of each frame member by a pin 15 is an axle member 16 and fixed to the inner end member by pins 17 (Fig. 3) is a complementary axle 19.

Each truck frame is pivoted to its bolster by king bolts 22 and transom plates 23 in a manner common to vehicle construction so that the trucks may turn in relation to the platform member under control of the propelling vehicle through the following steering mechanism:—

The front axle of each truck is connected to the front axle of the other truck of the same trailer body by pairs of reach rods 24—25 and 26—27, operating in longitudinal slots 28 formed at the horizontal center line of each axle, the outer ends of each pair of reach rods being fixed in the ends of the slots of the outer axle by pins 29 and 30 extending through the axle and the ends of the rods, and the opposite ends are fixed in the ends of the slots in the inner axles by pins 31 and 32 at points opposite their connection to the outer axles so that the rods are crossed as at 33, as shown in Figs. 1 and 2.

I also prefer to brace the inner axle of each truck by radius rods 34 and 35 attached to the pins 31 and 32 in the inner axles and to the pivot pin 15 of the front axle, thus keeping the rear axles in alignment and at right angles to their frame members.

Each of the end axles is provided with V shaped coupling or draw members 36 and 37, the legs of which are attached to the reach connection pins 28 and 29.

Assuming the truck to be constructed and assembled as described, the operation is as follows:

Under straight line travel of the trailer the front and rear trucks operate in an ordinary manner, but when the trailer is to be turned, the steering connection between trucks comes into play. If the trailer is turned to the right (Fig. 1), under direction of the draft vehicle, the front axle will turn to the right upon its pivot, causing the rod 25 to push backward and its complementary rod 24 to pull forward, turning the rear truck at an angle upon its king bolt substantially equal but opposite to the angle of the front axle and at the same time the front truck turns upon its king bolt in following the draft, causing the rod 27 to push backward and the other rod, 26, to pull forward, turning the outer axle on the rear truck at an angle complementary to the front axle of the front truck so that all of the axles are turned at such an angle that their longitudinal center lines will intersect at a common point and about which the wheels will move in a circle until the draft vehicle again changes the angle of the front truck.

Thus it will be seen that the corresponding wheels of the front and rear trucks will follow in substantially the same path regardless of the direction the trailer is traveling.

It will also be apparent that the improvements of my invention may be embodied in any vehicle of the multiple truck type, and therefore, I do not wish to be limited to the construction of the vehicle shown.

What I claim and desire to secure by Letters-Patent is:—

1. In a vehicle comprising a plurallity of pivotally mounted trucks, each having a fixed axle and a pivoted axle, and reach rods connecting the pivoted axle of one truck to the fixed axle of the following truck to turn the trucks synchronously.

2. In a vehicle comprising a plurality of pivotally mounted trucks, each having a fixed axle and a pivoted axle, reach rods pivotally connected to the ends of the pivoted axle and to opposite ends of the fixed axle, the rods crossing within their length.

3. In a vehicle comprising a plurality of pivotally mounted trucks, each having a pivoted axle and a fixed axle, the fixed axle having a longitudinal slot, crossed reach rods connecting the pivoted axle of one truck to the fixed axle of the following truck, the intermediate portions of the reach rods being supported in the slot of the fixed axle of the first truck.

4. In a vehicle comprising front and rear pivoted truck frames, pivoted axles mounted on the front of the front frame and on the rear of the rear frame, fixed axles on the other ends of the frames and reach rods connecting the fixed axles to the pivoted axles.

5. In a vehicle comprising front and rear pivoted truck frames, pivoted axles on the front of the front frame and on the rear of the rear frame, fixed axles at the other ends of the frames and reach rods pivotally fixed to the ends of the pivoted axles and to the opposite ends of the fixed axles.

In testimony whereof I affix my signature.

GRAHAM H. CRAVENS.